US010921997B2

(12) United States Patent
Hu

(10) Patent No.: US 10,921,997 B2
(45) Date of Patent: Feb. 16, 2021

(54) INFORMATION CAPTURE DEVICE AND CONTROL METHOD THEREOF

(71) Applicant: GETAC TECHNOLOGY CORPORATION, Hsinchu County (TW)

(72) Inventor: Chien-Chih Hu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 7 days.

(21) Appl. No.: 16/211,183

(22) Filed: Dec. 5, 2018

(65) Prior Publication Data

US 2020/0081637 A1    Mar. 12, 2020

Related U.S. Application Data

(60) Provisional application No. 62/728,265, filed on Sep. 7, 2018.

(51) Int. Cl.
*G06F 12/00* (2006.01)
*G06F 3/06* (2006.01)

(52) U.S. Cl.
CPC .......... *G06F 3/0629* (2013.01); *G06F 3/0604* (2013.01); *G06F 3/0673* (2013.01)

(58) Field of Classification Search
CPC ..... G06F 3/0629; G06F 3/0604; G06F 3/0673
See application file for complete search history.

(56) References Cited

U.S. PATENT DOCUMENTS

| 6,584,272 B1* | 6/2003 | Fukushima | H04N 5/76 386/230 |
|---|---|---|---|
| 2004/0135900 A1 | 7/2004 | Pyle et al. | |
| 2013/0128067 A1* | 5/2013 | Boland | H04N 5/23203 348/211.2 |
| 2016/0150270 A1* | 5/2016 | Chang | H04N 21/4334 386/295 |
| 2016/0364141 A1* | 12/2016 | Yeh | G06F 3/061 |
| 2018/0213178 A1 | 7/2018 | Wan | |

OTHER PUBLICATIONS

European Patent Office, Search Report, Patent Application Serial No. 18210425.7, dated Apr. 16, 2019, Germany.

* cited by examiner

*Primary Examiner* — Shawn X Gu

(57) ABSTRACT

An information capture device includes a camera member, a storage unit, a network module and a processing unit. The camera member captures an ambient environment to generate an environment image stream of the ambient environment. The storage unit has a storage space. The network module receives a cyclic recording policy through a network, wherein the cyclic recording policy includes an activation instruction and a storage capacity setting. The processing unit calculates a designated storage capacity according to the storage capacity setting and a total capacity of the storage space, detects a spare capacity of the storage space according to the designated storage capacity, limits the designated storage capacity to be used exclusively for the cyclic recording process, and activates and executes the cyclic recording process according to the activation instruction when the spare capacity satisfies the designated storage capacity.

15 Claims, 5 Drawing Sheets

INFORMATION CAPTURE DEVICE AND CONTROL METHOD THEREOF

CROSS-REFERENCE TO RELATED APPLICATIONS

This application claims priority from U.S. Patent Application Ser. No. 62/728,265, filed on Sep. 7, 2018, the entire disclosure of which is hereby incorporated by reference.

BACKGROUND OF THE INVENTION

Field of the Invention

The present invention relates to an information capture device and a control method thereof, and more particularly to an information capture device having a cyclic recording process and a control method thereof.

Description of the Prior Art

In general, an information capture device is for abstracting media data such as surrounding video and audio at all times. With the rising of security awareness of the general public, an information capture device, featuring both convenience and a real-time information recording property, can serve as a security assistant device and is extensively applied in various fields. For example, a motorcyclist can assist in obtaining a record of a driving vehicle by wearing an information capture device while riding a motorbike, or law enforcement staff can assist in conducting law enforcement by wearing an information capture device while on duty. Further, the media data recorded by such information capture device can be later used for evidence provision and responsibility clarification.

However, if a person wearing an information capture device forgets to activate the information capture device, or abstracted data is maliciously deleted or damaged by a person wearing the information apparatus or other individuals with ill intentions, the abstracted data can be lost.

SUMMARY OF THE INVENTION

In view of the above, the present invention provides an information capture device and a control method thereof capable of cyclically recording abstracted data according to a set storage capacity, and abstracted data thereof cannot be arbitrarily removed or damaged.

In one embodiment, a control method of an information capture device includes receiving a cyclic recording policy including an activation instruction and a storage capacity setting, calculating a designated storage capacity according to the storage capacity setting and a total capacity of a storage space of the information capture device, detecting a spare capacity of the storage space according to the designated storage capacity, and when the spare capacity of the storage space satisfies the designated storage capacity, limiting the designated storage capacity to be used exclusively for a cyclic recording process and executing the activation instruction to activate and execute the cyclic recording process according to the activation instruction. The remaining part of the spare capacity in the storage space is used for a non-cyclic information recording process.

In one embodiment, a control method of an information capture device includes receiving a cyclic recording policy including an activation instruction and a storage capacity setting, detecting a spare capacity of the storage space, calculating a designated storage capacity according to the storage capacity setting and the spare capacity, limiting the designated storage capacity to be used exclusively for a cyclic recording process, and executing the activation instruction to activate and execute the cyclic recording process according to the activation instruction. The remaining part of the spare capacity in the storage space is used for a non-cyclic information recording process.

In one embodiment, an information capture device includes a camera member, a storage unit, a network module and a processing unit. The camera member captures an ambient environment to generate an environment image stream of the ambient environment. The storage unit has a storage space. The network module receives a cyclic recording policy through a network, wherein the cyclic recording policy includes an activation instruction and a storage capacity setting. The processing unit, coupled to the storage unit and the network module, calculates a designated storage capacity according to the storage capacity setting and a total capacity of the storage space, detects a spare capacity of the storage space according to the designated storage capacity, and when the spare capacity satisfies the designated storage capacity, limits the designated storage capacity to be used exclusively for a cyclic recording process and executes the activation instruction to activate and execute the cyclic recording process according to the activation instruction. At this point, the remaining part of the spare space in the storage space is used for a non-cyclic information recording process. When the processing unit executes the cyclic recording process, the processing unit enables the camera member, and stores the environment image stream in a storage space of the designated storage capacity. When the processing unit executes the non-cyclic information recording process and the cyclic recording process is at the same time executed, the processing unit enables the camera member, and stores the environment image stream in the storage space of the remaining part of the spare capacity.

In one embodiment, the information capture device includes a camera member, a storage unit, a network module and a processing unit. The camera member captures an ambient environment to generate an environment image stream of the ambient environment. The storage unit has a storage space. The network module receives a cyclic recording policy through a network, wherein the cyclic recording strategy includes an activation instruction and a storage capacity setting. The processing unit, coupled to the storage unit and the network module, detects a spare capacity of the storage space, calculates a designated storage capacity according to the storage capacity setting and the spare capacity, limits the designated storage capacity to be used exclusively for a cyclic recording process, and executes the activation instruction to activate and execute the cyclic recording process according to the activation instruction. At this point, the remaining part of the spare capacity in the storage space is used for a non-cyclic information recording process. When the processing unit executes the cyclic recording process, the processing unit enables the camera member and stores the environment image stream in the storage space of the designated storage capacity. When the processing unit executes the non-cyclic information recording process and the cyclic recording process is also executed, the processing unit enables the camera member and stores the environment image stream in the storage space of the remaining part of the spare capacity.

In conclusion, in the information capture device and the control method thereof according to an embodiment of the present invention, without modifying the hardware design of the information capture device, various types of data recorded is protected through executing the cyclic recording policy, thus preventing any malicious damage. The information capture device and the control method thereof according to an embodiment of the present invention allow a cyclic recording process and a non-cyclic information recording process to be smoothly performed simultaneously.

DETAILED DESCRIPTION OF THE EMBODIMENTS

Figure 1:
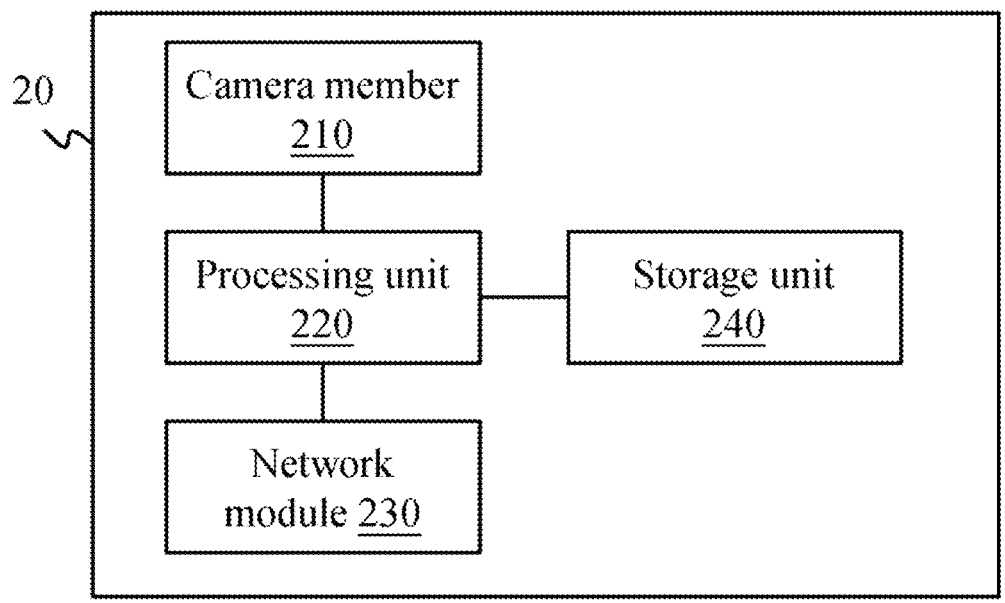
FIG. 1. is a function block diagram of an information capture device according to an embodiment of the present invention.
Figure 2:
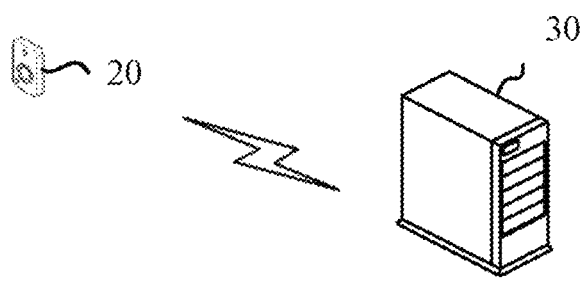
FIG. 2 is a system schematic diagram of an information capture device according to an embodiment of the present invention.

FIG. 1 shows a function block diagram of an information capture device according to an embodiment of the present invention. FIG. 2 shows a system schematic diagram of an information capture device according to an embodiment of the present invention.

Referring to FIG. 1 and FIG. 2, an information capture device 20 includes a camera member 210, a processing unit 220, a network module 230 and a storage unit 240. The processing unit 220 is coupled to the camera member 210, the network module 230 and the storage unit 240. In some embodiments, the information capture device 20 may be, for example but not limited to, a multimedia recording device such as a body-worn camera, an IP camera, Walkman, a recorder pen, a cell phone or a vehicle driving recorder. In some embodiments, the processing unit 220 may be, for example but not limited to, a central processing unit (CPU), a system-on-chip (SoC), or a microcontroller (MCU).

The camera member 210 can record images and/or sounds of an ambient environment. That is to say, the camera member 210 can capture an ambient environment to generate an environment image stream of the ambient environment. To put to use, a user can operate an activation switch on the information capture device 20 to enable the information capture device 20 to perform real-time information recording. At this point, such information recording is a non-cyclic information recording process of the information capture device 20. In some embodiments, the camera member 210 can be implemented by a camera lens, a microphone and an image processing unit.

The storage unit 240 has a storage space, which is for storing the above environment image stream. The storage space refers to a storage space remained in the storage unit 240 after deducting a system occupied area or a bad track area in the storage unit 240. The entire capacity of the storage space is referred to as a total capacity, and the remaining capacity of deducting capacity used for storing the environment image stream recorded by the non-cyclic information recording process is referred to as a spare capacity. In some embodiments, the storage unit 240 may be implemented by one or more storage elements. The storage elements may be a non-volatile memory, e.g., a read-only memory (ROM), a flash memory, or a volatile memory, such as a random access memory (RAM).

Referring to FIG. 1 and FIG. 2, the network module 230 is connected to a host 30 through the Internet to receive a cyclic recording policy. The network module 230 may be, for example but not limited to, a communication module such as a WiFi module, a 3G module or a 4G module. The host 30 may be, for example but not limited to, an electronic device having a connection function, such as a smart phone, a tablet computer, a computer, a laptop computer or a server.

In some embodiments, the cyclic recording policy may be a plurality of instructions for the information capture device 20, such as an enable/disable principle, a resource allocation method, condition settings or logic determination. In some embodiments, the processing unit 20 can implement a cyclic recording policy of an embodiment through executing firmware or software algorithms stored in the storage unit 240, wherein the firmware or software algorithms may be implemented by a plurality of computer program instructions. In some embodiments, the plurality of computer program instructions may be stored in a computer program product; at this point, the computer program product may be a readable recording medium, and can be loaded and executed by the information capture device 20. In some embodiments, the above computer program instructions are computer program products, and are transmitted to the information capture device 20 through a wired or wireless means (and stored in the storage unit 240).

In some embodiments, the processing unit 220 executes the cyclic recording process according to the cyclic recording policy. For example, while the cyclic recording process is executed, the processing unit 220 continuously abstracts a status monitoring record (e.g., operation conditions of components in the information capture device 20, timestamps at which systems are activated, moving position records of the information capture device 20, and image information or sound information obtained by the camera member 210), and stores the same in a storage space of a designated storage capacity of the storage unit 240. In some embodiments, the various records obtained in the cyclic recording process cannot be deleted through the information capture device 20. In other words, the information capture device 20 performs a function similar to that of a black box through loading the cyclic recording policy.

Figure 3:
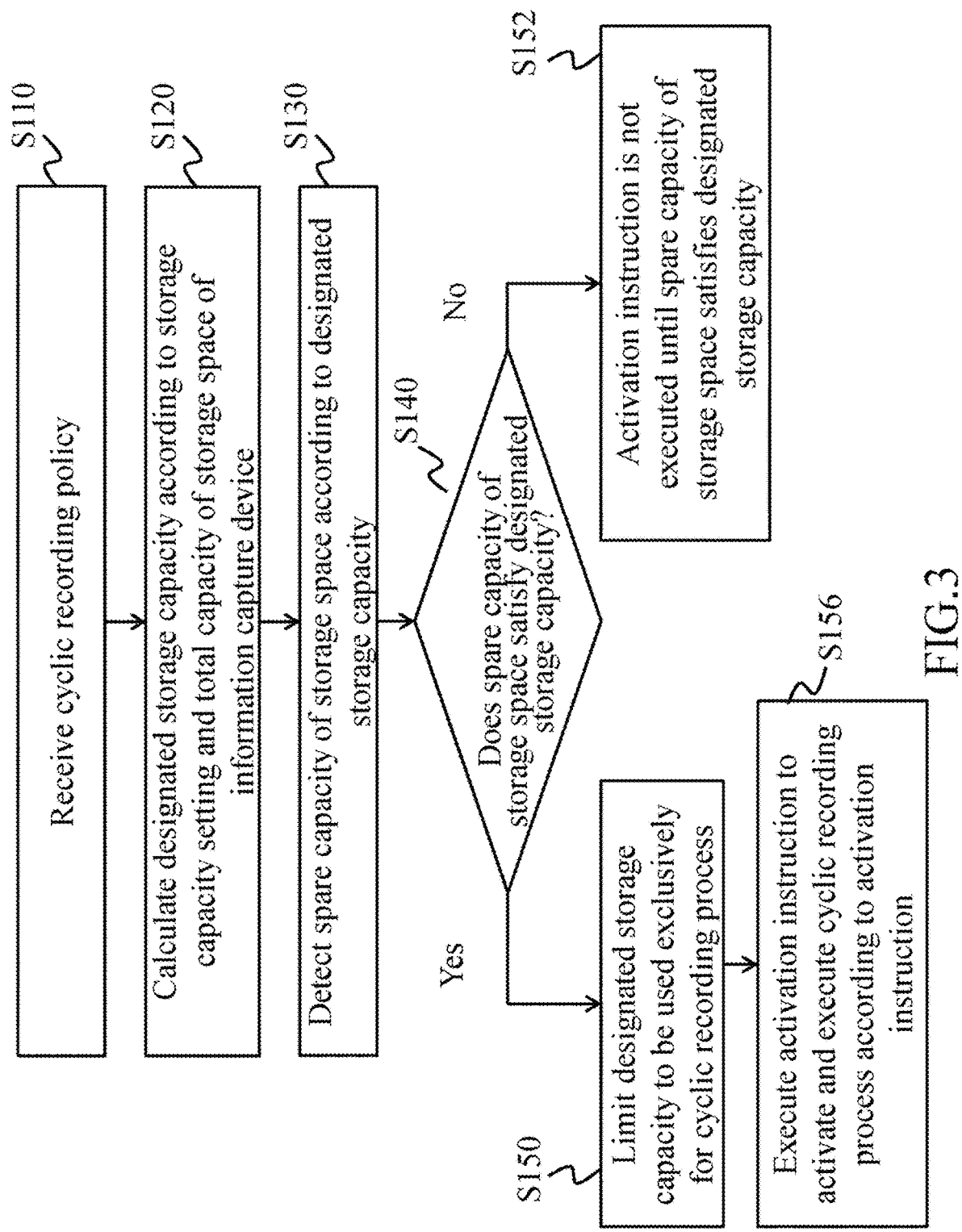
FIG. 3 is a flowchart of a control method of an information capture device according to an embodiment of the present invention.
Figure 4:
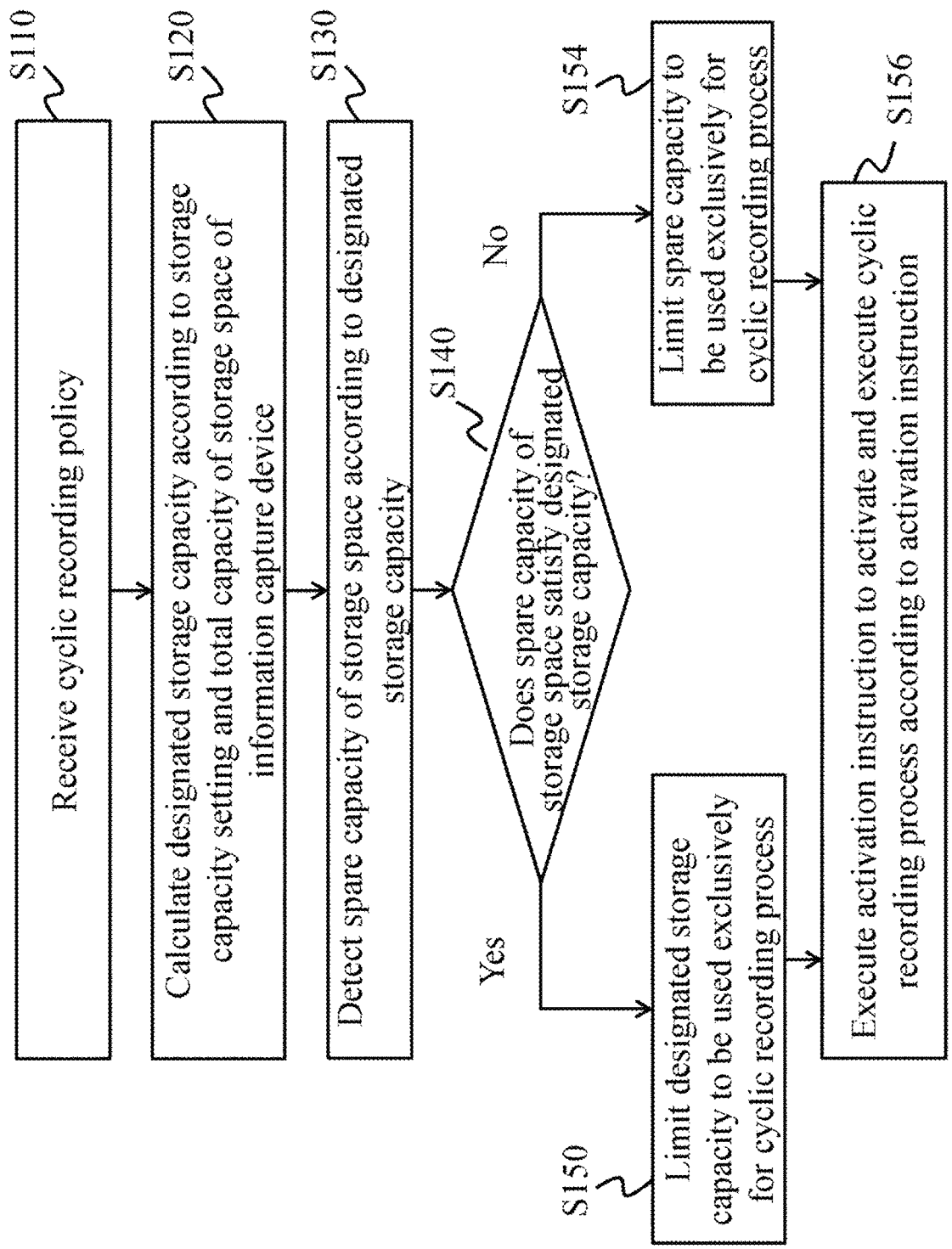
FIG. 4 is a flowchart of a control method of an information capture device according to an embodiment of the present invention.

FIG. 3 and FIG. 4 are flowcharts of a control method of an information capture device according to an embodiment of the present invention. The information capture device 20 first receives a cyclic recording policy through the network module 230 via a network (step S110). At this point, the cyclic recording policy at least includes an activation instruction and a storage capacity setting.

The processing unit 220 then calculates a designated storage capacity according to the storage capacity setting and a total capacity of the storage space of the storage unit 240 (step S120).

In some embodiments, in the cyclic recording policy, the storage capacity is directly set to a predetermined value, and the designated storage capacity is the predetermined value. For example, the storage capacity in the cyclic recording policy is set as 5 GB, and the designated storage capacity is 5 GB. In some embodiments, the storage capacity in the cyclic recording policy is set to a predetermined ratio, and the designated storage capacity is a total capacity of a predetermined ratio. For example, the storage capacity in the cyclic recording policy is set as 40%, and the designated storage capacity is 4 GB when the total storage capacity of the storage space of the storage unit 240 is 10 GB.

Referring to FIG. 3, after the designated storage capacity is calculated, a spare capacity of the storage space is detected according to the designated storage capacity (step S130), and it is determined whether the spare capacity of the storage space satisfies the designated storage capacity (step S140).

In some embodiments, step S140 is next performed, in which when the spare capacity satisfies the designated storage capacity, the designated storage capacity is limited to be used exclusively for the cyclic recording policy (step S150). That is to say, when the space of the spare capacity is greater than the space required by the designated storage capacity, the designated storage capacity is separated from the total capacity of the storage space and is limited to be used for executing the cyclic recording process, and the remaining part of the spare capacity in the storage space is used for a non-cyclic information recording process. At this point, the cyclic recording process executed by the processing unit 220 is that the processing unit 220 enables the camera member 210, and stores the environment video stream in the storage space of the designated storage capacity. On the other hand, when the processing unit 220 executes the non-cyclic information recording process and the cyclic recording process is being executed, the processing unit 220 enables the camera member 210 and stores the environment image stream in the storage space of the remaining part of the spare capacity.

In some embodiments, step S140 is next performed, in which when the spare capacity does not satisfy the designated storage capacity, the activation instruction is not executed until the spare capacity of the storage space satisfies the designated storage capacity (step S152). That is to say, when the space of the spare capacity is smaller than the space required by the designated storage capacity, the existing spare capacity is limited to be exclusively used for the non-cyclic information recording process, and the processing unit 220 can use only the currently used storage space to execute the non-cyclic information recording process. Further, each time when the processing unit 220 discovers that a new spare capacity becomes available in the storage space used by the non-cyclic information recording process, the new spare capacity of the storage space is again detected according to the designated storage capacity and it is determined whether the new spare capacity of the storage space satisfies the designated storage capacity, the new spare capacity is limited to be used exclusively for the non-cyclic information recording process when the new spare capacity still does not satisfy the designated storage capacity, and the above limiting process is repeated and only stopped when the spare capacity satisfies the designated storage capacity. Further, a condition of having detected that the spare capacity satisfies the designated storage capacity is defined as a trigger enable principle, and the information capture device 20 then starts executing the cyclic recording process.

Referring to FIG. 4, in some embodiments, after step S140, when the spare capacity does not satisfy the designated storage capacity, the processing unit 220 limits the spare capacity to be exclusively used for the cyclic recording process (step S154), and directly starts executing the cyclic recording process according to the activation instruction (step S156). That is to say, when the space of the spare capacity is smaller than the space required by the designated storage capacity, the existing spare capacity is limited to be exclusively used for the cyclic recording process, and the processing unit 220 uses the existing spare capacity to start executing the cyclic recording process.

FIG. 5 to FIG. 8 are schematic diagrams of a state of use of a storage space according to an embodiment of the present invention. In the drawings, a shaded storage block represents a storage block with stored information, and an unshaded storage space represents a spare storage block without stored information. Assume that the storage space in the storage unit 240 includes ten storage blocks F01 to F10, and each of the storage blocks has a storage capacity of 1 GB, as shown in FIG. 5 to FIG. 8.

Figure 5:
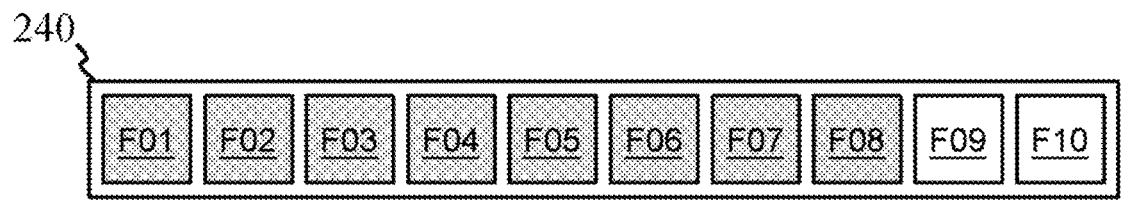
FIG. 5 is a schematic diagram of a status of use of a storage space according to an embodiment of the present invention.

In an example, referring to FIG. 5, the storage block F01 to the storage block F08 are stored with an environment image stream (including a first environment image stream and a second environment image stream) generated by the camera member 210 in the non-cyclic information recording process. The storage block F01 and the storage block F02 are stored with the first environment image stream, and the storage block F03 to the storage block F08 are stored with the second environment image stream. In other words, the storage block F01 to the storage block F08 in the storage space of the storage unit 240 are used, and the storage block F09 and the storage block F10 are spare. Further, the total storage capacity of the spare storage block F09 and the storage block F10 is 2 GB.

The processing unit 220 receives the cyclic recording policy through the network module 230 and accordingly detects the spare capacity of the storage unit 240. The designated storage capacity is calculated as 5 GB according to the storage capacity setting in the cyclic recording policy. When the processing unit 220 detects that the spare capacity of the storage unit 240 is 2 GB (less than 5 GB, that is, the spare capacity does not satisfy the designated storage capacity), the processing unit 220 does not execute the activation instruction, and limits the storage capacity of the spare storage block F09 and storage block F10 to be used exclusively for the cyclic recording process. At this point, when a user wishes to store a third environment image stream, the information capture device 20 notifies the user that the storage space is fully occupied.

Figure 6:
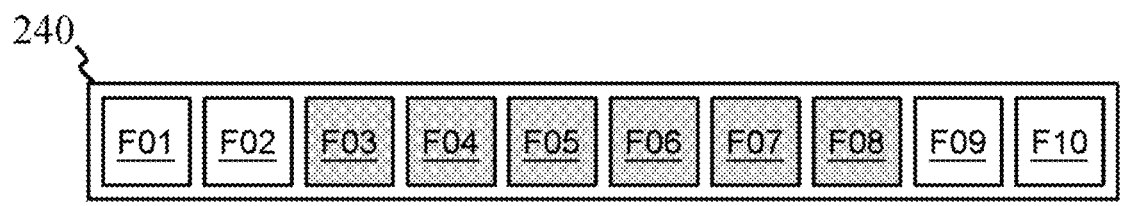
FIG. 6 is a schematic diagram of a status of use of a storage space according to an embodiment of the present invention.
Figure 7:
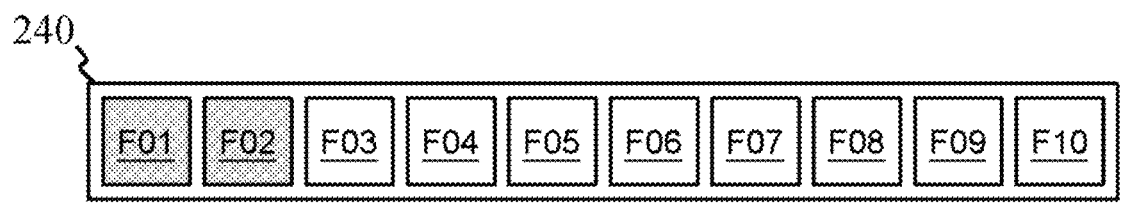
FIG. 7 is a schematic diagram of a status of use of a storage space according to an embodiment of the present invention.

Referring to FIG. 6, after the user later chooses to delete the first environment image stream (for example, directly deleting the first environment image stream or outputting the first environment image stream to another device such as a server or an external host), the processing unit 220 detects that the storage block F01 and the storage block F02 are spare, and the spare capacity of the storage block F01, the storage block F02, the storage block F09 and the storage block F10 is 4 GB, which still does not satisfy the designated storage capacity. Thus, the processing unit 220 again limits the storage capacity of the storage block F01 and the storage block F02 to be exclusively used for the cyclic recording processing; that is, the storage capacity of the storage block F01, the storage block F02, the storage block F09 and the storage block F10 is used exclusively for the cyclic recording policy. At this point, when the user wishes to store the third environment image stream, the information capture device 20 still notifies the user that the storage space is fully occupied. Next, after the user chooses to delete the second environment image stream, the processing unit 220 detects that the storage block F03 to the storage block F08 are spare, and the spare capacity of the storage block F01 to the storage block F10 is 10 GB, which satisfies the designated storage capacity. Thus, the processing unit 220 further limits the storage capacity of the storage block F03 to be used exclusively for the cyclic recording process. At this point, the processing unit 220 limits the storage block F01 to the storage block F03, the storage block F09 and the storage block F10 to be used exclusively for the cyclic recording process; that is, the spare capacity of the storage space now satisfies the designated storage capacity. At this point, the processing unit 220 executes the activation instruction, and uses the storage block F01 to the storage block F03, the storage block F09 and the storage block F10 for executing the cyclic recording process. On the other hand, the storage block F04 to the storage block F08 are used for environment image streams when the non-cyclic information recording process is executed.

In another example, referring to FIG. 5, when the processing unit 220 detects that the spare capacity of the storage unit 240 is 2 GB (less than 5 GB, that is, the spare capacity does not satisfy the designated storage capacity), the processing unit 220 does not execute the activation instruction, and waits until the spare capacity reaches or exceeds 5 GB and then again limits the designated storage capacity in the spare capacity to be used exclusively for the cyclic recording process and executes the activation instruction. For example, referring to FIG. 7, after the user chooses to delete the second environment image stream, the processing unit 220 detects that the storage block F03 to the storage block F08 are spare and the spare capacity of the storage block F03 to the storage block F10 is 8 GB, which exceeds the designated storage capacity of 5 GB, and thus limits the 5 GB storage capacity of the storage block F06 to the storage block F10 to be used exclusively for the cyclic recording process. At this point, when the user wishes to store the third environment image stream, the information capture device 20 stores the third environment image stream in the storage block F03 to the storage block F05.

In yet another example, referring to FIG. 5, when the processing unit 220 detects that the spare capacity of the storage unit 240 is 2 GB (less than 5 GB, that is, the spare capacity does not satisfy the designated storage capacity), the processing unit 220 can also directly use the spare capacity (the storage block F09 and the storage block F10) as the designated storage capacity, limit the same to be used exclusively for the cyclic recording policy, and then execute the activation instruction.

In some embodiments, the designated storage capacity may be in a same area of the storage space; in some embodiments, the designated storage capacity may be distributed in different areas of the storage space, given that the total capacity of these different areas achieve the designated storage capacity. At this point, taking FIG. 8 for example, the processing unit 220 limits the storage block F01, the storage block F02, the storage block F05, the storage block F09 and the storage block F10 to be used exclusively for the cyclic recording process; that is, although with different areas of the storage space, the spare capacity can similarly satisfy the designated storage capacity.

Figure 8:
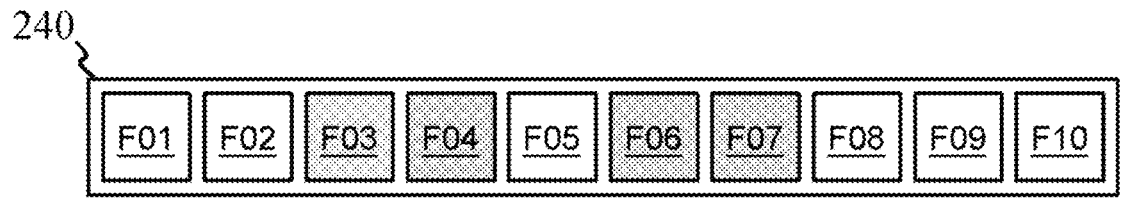
FIG. 8 is a schematic diagram of a status of use of a storage space according to an embodiment of the present invention.

In yet another example, referring to FIG. 8, the storage block F03 and the storage block F04 are stored with the first environment image stream and the storage block F06 and the storage block F07 are stored with the second environment image stream generated by the camera member 210 during the non-cyclic information recording process. The processing unit 220 limits the storage block F01, the storage block F02, the storage block F05, the storage block F09 and the storage block F10 to be used exclusively for the cyclic recording process; that is, the spare capacity of the storage space satisfies the designated storage capacity. At this point, the processing unit 220 executes the activation instruction, and uses the storage block F01, the storage block F02, the storage block F05, the storage block F09 and the storage block F10 for executing the cyclic recoding process. On the other hand, the storage blocks F03 and F04 and the storage blocks F06 to F08 are used for the environment image stream when the non-cyclic information recording process is executed. For example, the third environment image stream is stored in the storage block F08 according to a user instruction.

In some embodiments, the cyclic recording process and the non-cyclic information recording process simultaneously abstract the environment image stream generated by the camera member 210. Again taking FIG. 8 for instance, when the processing unit 220 simultaneously executes the cyclic recording process and the non-cyclic information recording process, the processing unit 220 considers the environment image stream generated by the camera member 210 as a state monitoring record and stores the same in the storage blocks F01, F02, F05, F09 and F10, and considers the environment image stream simultaneously abstracted by the camera member 210 as the third environment image stream and stores the same in the storage block F08 according to a user instruction.

Figure 9:
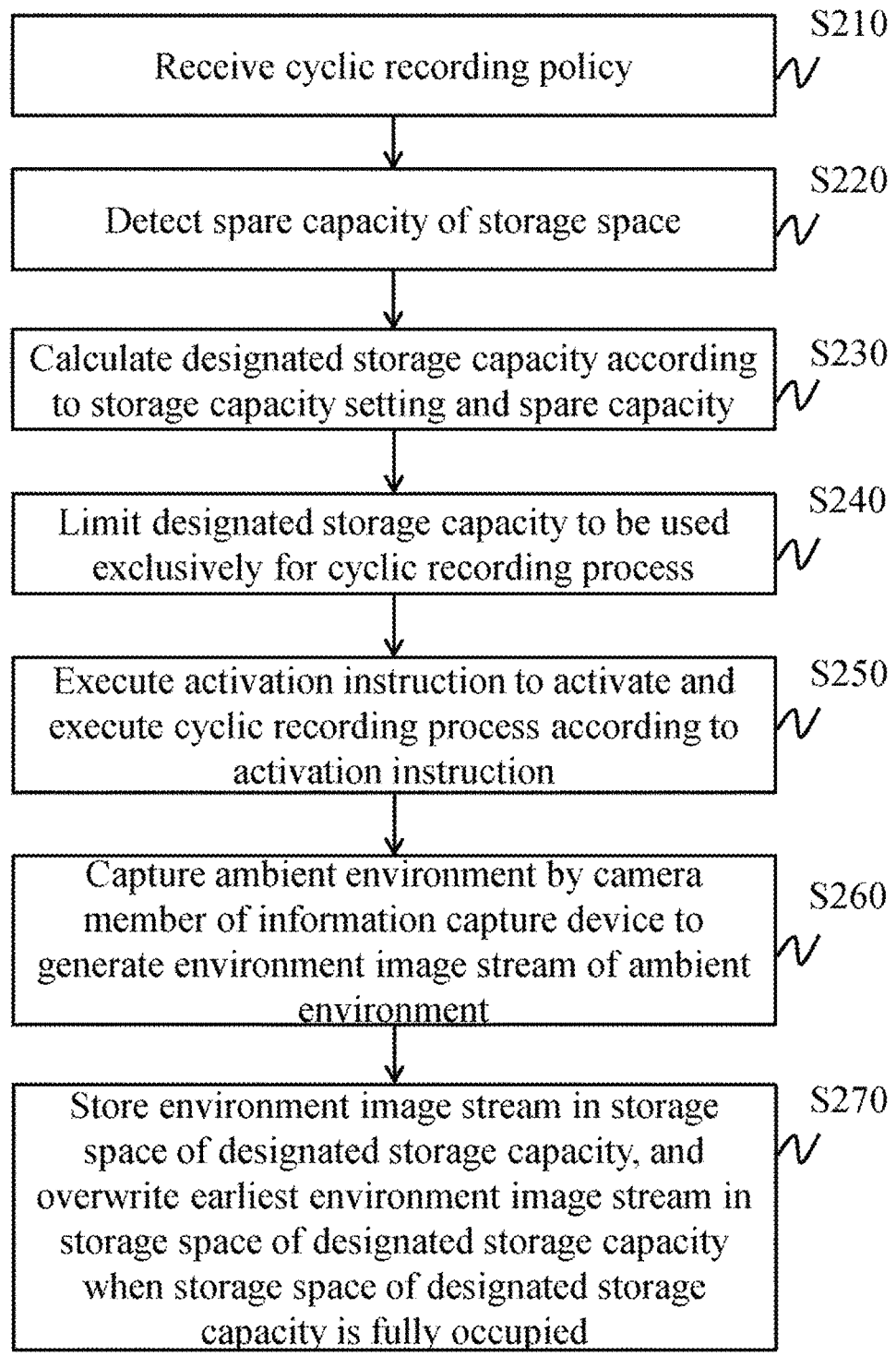
FIG. 9 is a flowchart of a control method of an information capture device according to an embodiment of the present invention.

FIG. 9 shows a flowchart of a control method of an information capture device according to an embodiment of the present invention. Referring to FIG. 9, in some embodiments, the information capture device 20 receives a cyclic recording policy through the network module 230 via a network (step S210). At this point, the cyclic recording policy includes at least an activation instruction and a storage capacity setting. Next, the processing unit 220 detects a spare capacity of the storage space of the storage unit 240 (step S220).

The designated storage capacity is then calculated according to the storage capacity setting and the detected spared capacity (step S230). At this point, in some embodiments, the storage capacity setting in the cyclic recording policy is a predetermined ratio, and the designated storage capacity is a spare capacity of the predetermined ratio. For example, the storage capacity setting in the cyclic recording policy is 40%, and the designated storage capacity is 3.2 GB when the spare capacity of the storage space of the storage unit 240 is 8 GB.

After the designated storage capacity is calculated, the designated storage capacity is limited to be used exclusively for the cyclic recording process (step S240), and the activation instruction is executed to activate and execute the cyclic recording process according to the activation instruction (step S250).

In some embodiments, the activation instruction in step S156 and step S250 includes an enable (or disable) principle, and the information capture device 20 starts executing the cyclic recording process when the enable principle is triggered. In some embodiments, the information capture device 20 includes a state sensor, and the enable principle is considered triggered when the state sensor detects a predetermined state. For example, the state sensor can detect a sound of a gun shot through a sound sample, the enable principle is considered enabled upon detecting the gun shot, and the information capture device 20 accordingly starts executing the cyclic recording process. For another example, the state sensor can achieve such triggering through distance sensing, the enable principle is considered triggered when an information capture device worn by medical staff approaches an ambulance to perform a rescue task, and the information capture device 20 accordingly starts executing the cyclic recording process. That is to say, the cyclic recording process is in an inactivated state, a hibernation state or a non-operating state when the information capture device 20 is in a normal state, and is enabled only when an event occurs, thus reducing the utilization power consumption and prolonging the durability of the information capture device 20.

In some embodiments, the cyclic recording process executed in step S156 or step S250 includes the following: the camera member 210 of the information capture device 20 captures an ambient environment to generate an environment image stream of the ambient environment (step S260), the environment image stream is stored in the storage space of the designated storage capacity, and an earliest environment image stream in the storage space of the designated storage capacity is overwritten when the storage space of the designated storage capacity is fully occupied (step S270).

It should be noted that, the orders according to which the foregoing steps are described are not to be construed as a limitation to the present invention, and a person skilled in the art can simultaneously perform some of these steps or exchange the orders of some of these steps under reasonable conditions.

While the invention has been described by way of example and in terms of the embodiments, it is to be understood that the invention is not limited thereto. Modifications and similar arrangements and process can be made by a person skilled in the art without departing from the spirit and scope of the present invention. Therefore, the scope of the appended claims should be accorded with the broadest interpretation so as to encompass all such modifications and similar arrangements and process.

What is claimed is:

1. A control method of an information capture device having a storage space, comprising:
   receiving a cyclic storage policy, which comprises an activation instruction and a storage capacity setting;
   calculating a designated storage capacity according to the storage capacity setting and a total capacity of a storage space of the information capture device wherein a spare capacity of the storage space is less than the designated storage capacity;
   repeating the following steps until the spare capacity of the storage space satisfies the designated storage capacity:
      detecting spare blocks of the storage capacity upon deletion of content stored therein; and
      reserving the spare blocks to be used only for a cyclic recording process; and
   when, and only when, the spare capacity of the storage space satisfies the designated storage capacity, limiting the designated storage capacity to be used exclusively for the cyclic recording process, and executing the activation instruction to activate and execute the cyclic recording process, wherein a remaining part of the spare capacity in the storage space is made available for a non-cyclic information recording process.

2. The control method of an information capture device according to claim 1, wherein the storage capacity setting is a predetermined value, and the designated storage capacity is the predetermined value.

3. The control method of an information capture device according to claim 1, wherein the storage capacity setting is a predetermined ratio, and the designated storage capacity is defined by the total capacity multiplied by the predetermined ratio.

4. The control method of an information capture device according to claim 1, wherein the step of executing the cyclic recording process comprises:
   capturing an ambient environment by a camera member of the information capture device to generate an environment image stream of the ambient environment; and
   storing the environment image stream in storage space of the designated storage capacity, and overwriting an earliest of the environment image stream in the storage space of the designated storage capacity when the storage space of the designated storage capacity is fully occupied.

5. A control method of an information capture device, comprising:
   receiving a cyclic recording policy, which comprises an activation instruction and a storage capacity setting;
   detecting a spare capacity of a storage space;
   calculating a designated storage capacity according to the storage capacity setting and the spare capacity;
   limiting the designated storage capacity to be used exclusively for a cyclic recording process;
   executing the activation instruction to activate and execute the cyclic recording process according to the activation instruction, wherein a remaining part of the spare capacity in the storage space is used for a non-cyclic information recording process, wherein the step of executing the cyclic recording process comprises:
      capturing an ambient environment by a camera member of the information capture device to generate an environment image stream of the ambient environment; and
      storing the environment image stream in storage space of the designated storage capacity, and overwriting an earliest of the environment image stream in the storage space of the designated storage capacity when the storage space of the designated storage capacity is fully occupied; and
   executing the non-cyclic information recording process, wherein the non-cyclic information recording process comprises storing the environment image stream in the storage space of the remaining part of the spare capacity.

6. The control method of an information capture device according to claim 5, wherein the storage capacity setting is a predetermined ratio, and the designated storage capacity is defined by the spare capacity multiplied by the predetermined ratio.

7. An information capture device, comprising:
   a camera member, capturing an ambient environment to generate an environment image stream of the ambient environment;
   a storage unit, having a storage space;

a network module, receiving a cyclic recording policy through a network, wherein the cyclic recording policy comprises an activation instruction and a storage capacity setting; and a processing unit, coupled to the storage unit and the network module, detecting a spare capacity of the storage space, calculating a designated storage capacity according to the storage capacity setting and the spare capacity, limiting the designated storage capacity to be used exclusively for a cyclic recording process, and executing the activation instruction to activate and execute the cyclic recording process according to the activation instruction, wherein a remaining part of the spare capacity in the storage space is used for a non-cyclic information recording process;

wherein, when the processing unit executes the cyclic recording process, the processing unit enables the camera member to capturing the ambient environment to generate the environment image stream of the ambient environment, and stores the environment image stream in the storage space of the designated storage capacity, and overwrite an earliest of the environment image stream in the storage space of the designated storage capacity when the storage space of the designated storage capacity is fully occupied; and wherein, when the processing unit executes the non-cyclic information recording process, the processing unit enables the camera member and stores the environment image stream in the storage space of the remaining part of the spare capacity.

8. The information capture device according to claim 7, wherein the storage capacity setting is a predetermined ratio, and the designated storage capacity is defined by the spare capacity multiplied by the predetermined ratio.

9. The information capture device according to claim 7, wherein the processing unit further comprises:

calculates the designated storage capacity according to the storage capacity setting and a total capacity of the storage space, detects the spare capacity of the storage space according to the designated storage capacity, limits the designated storage capacity to be used exclusively for the cyclic recording process when the spare capacity satisfies the designated storage capacity, and executes the activation instruction to activate and execute the cyclic recording process according to the activation instruction.

10. The information capture device according to claim 9, wherein when the spare capacity of the storage space does not satisfy the designated storage capacity, the processing unit does not execute the activation instruction until the spare capacity of the storage space satisfies the designated storage capacity.

11. The information capture device according to claim 9, wherein when the spare capacity of the storage space does not satisfy the designated storage capacity, the processing unit limits the spare capacity to be used exclusively for the cyclic recording process, and executes the activation instruction to activate and execute the cyclic recording process according to the activation instruction.

12. The information capture device according to claim 9, wherein the storage capacity setting is a predetermined value, and the designated storage capacity is the predetermined value.

13. The information capture device according to claim 9, wherein the storage capacity setting is a predetermined ratio, and the designated storage capacity is the total capacity of the predetermined ratio.

14. The information capture device according to claim 7, wherein the processing unit executes the non-cyclic information recording process while the cyclic recording process is being executed.

15. The information capture device according to claim 7, wherein the non-cyclic information recording process and the cyclic recording process are being executed simultaneously.

* * * * *